(12) United States Patent
Amend et al.

(10) Patent No.: US 6,220,866 B1
(45) Date of Patent: Apr. 24, 2001

(54) ELECTRONIC AUSCULTATION SYSTEM FOR PATIENT SIMULATOR

(75) Inventors: Greg J. Amend, Vestal; Craig S. Tinker, Port Crane, both of NY (US)

(73) Assignee: Eagle Simulation, Inc., Binghamton, NY (US)

( * ) Notice: Subject to any disclaimer, the term of this patent is extended or adjusted under 35 U.S.C. 154(b) by 0 days.

(21) Appl. No.: 09/228,838

(22) Filed: Jan. 12, 1999

Related U.S. Application Data
(60) Provisional application No. 60/071,440, filed on Jan. 15, 1998.

(51) Int. Cl.$^7$ .................................................. G09B 23/28
(52) U.S. Cl. ......................... 434/266; 434/262; 434/267; 381/67
(58) Field of Search ........................... 434/262, 265–267, 434/270, 307 R, 308, 318, 365, 396; 600/408, 440, 443, 528, 586; 381/67, 71.6, 71.7, 71.13, 72; 327/141, 297; 335/206; 341/20

(56) References Cited

U.S. PATENT DOCUMENTS

| | | | |
|---|---|---|---|
| 3,665,087 | * 5/1972 | Poylo ..................................... | 434/266 |
| 3,769,526 | * 10/1973 | Krause ................................... | 327/141 |
| 3,947,974 | * 4/1976 | Gordon et al. ......................... | 434/266 |
| 5,509,810 | * 4/1996 | Schertz et al. ......................... | 434/262 |
| 5,513,992 | * 5/1996 | Refait ..................................... | 434/267 |
| 5,718,227 | * 2/1998 | Witlin et al. ........................... | 600/528 |
| 5,812,678 | * 9/1998 | Scalise et al. ........................... | 381/67 |
| 5,853,292 | * 12/1998 | Eggert et al. ........................... | 434/262 |

* cited by examiner

Primary Examiner—Joe H. Cheng
(74) Attorney, Agent, or Firm—Malin, Haley & DiMaggio, P.A.

(57) ABSTRACT

An electronic auscultation system and method for simulating sounds arising from human organs for use in an anatomical simulation device including a patient simulating mannequin torso, a plurality of electro-magnetic transmitters having antenna coils positioned in predetermined locations relative to said torso beneath the torso surface and each transmitter being connected to one or more computer sound cards which, upon activation, generate signals from prerecorded sound data which generates the appropriate sounds of human organs based on the transmitter location. The system utilizes a simulated stethoscope that includes a receiver and/or sensing triggering devices so that the stethoscope can determine particular areas on the torso to define the appropriate sound generated such that the system knows where the stethoscope is.

5 Claims, 2 Drawing Sheets

ELECTRONIC AUSCULTATION SYSTEM FOR PATIENT SIMULATOR

STATEMENT REGARDING FEDERALLY SPONSORED RESEARCH OR DEVELOPMENT

This application claims benefit of provisional application 60/071,440 filed Jan. 15, 1998.

BACKGROUND OF THE INVENTION

1. Field of the Invention

The present invention relates to anatomical simulation devices, and, more particularly to an electronic auscultation system and method for simulating sounds arising from organs for use in training personnel in the medical arts.

2. Description of Related Art

Mankind has benefited greatly from the contributions of science and technology on advances in the medical arts. Such advances are largely responsible the existence and expansion of high quality, affordable health care throughout the world. One area of the medical arts that has benefited significantly from the influence of science and technology is in the field of medical personnel training where the use of technologically advanced patient simulators provides students with anatomically realistic simulation devices for use in training and medical study.

A number of simulation devices are known in the medical arts. For example, simulation devices are commonly used for CPR training, and in phlebotomy for training personnel in vein-puncture techniques. In addition, the background art reveals auscultation simulation devices. Some devices of the background art utilize a conventional stethoscope to detect sounds generated by speakers located within a manikin torso shell. The quality of sound, however, is effected by external noise, produced by motors and mechanical switches associated with the device.

U.S. Pat. No. 3,665,087, issued to Poylo in 1972, discloses a manikin audio system for use in producing simulated anatomical sounds in an area of a manikin under auscultation. Poylo discloses a relatively unsophisticated electromechanical audio simulation system that relies on a plurality of micro switches positioned in various physical areas for auscultation, which, when actuated, each activate the generation of an audio signal from a one of a plurality of synchronized magnetic storage mediums. A modified stethoscope is electrically connected to the magnetic signal producing apparatus and contains a transducer for producing an audio signal to the ear piece of the stethoscope. The pressure applied on an auscultation area will actuate one of the plurality of micro switches thereby selecting the associated audio signal that is electrically transmitted to the stethoscope transducer which generates an audio signal. The Poylo manikin, however, includes a number of disadvantages inherent with the use of micro switches and electromechanical magnetic media that limit the usefulness of the device.

Accordingly, there exists a need for an anatomical simulation device, including an electronic auscultation system and method for simulating sounds arising from organs.

BRIEF SUMMARY OF THE INVENTION

An electronic auscultation system and method for simulating sounds arising from organs. The apparatus and method includes a patient simulating manikin torso and a plurality of electromagnetic transmitters having antenna coils positioned in predetermined locations, beneath the torso surface, in areas where the monitoring of anatomical sounds is desired. Each transmitter is electrically connected to at least one computer sound card which, upon activation, generates signals from prerecorded sound files. A stethoscope is adapted for receiving signals transmitted by the antenna coil(s) and for converting the signals into sounds, heard by the stethoscope wearer, which sounds are free from external or unwanted noise. The stethoscope includes a bell end piece having a signal receiving antenna coil which is disposed such that the receiving antenna coil is in coaxial alignment with the transmitting antenna coil thereby forming a linear transformer when the bell is properly positioned with respect to the manikin torso. Once received, the signal is amplified and amplitude limited prior to demodulation and reproduction in stereoscope ear pieces of the stethoscope. Accordingly, the sounds heard by the stethoscope wearer are linked to a plurality physical locations on the manikin torso so that the sounds heard by the user are anatomically accurate representations of sounds that would be heard on an actual patient using a conventional stethoscope in the same physical locations.

The present invention may use any suitable carrier frequency acceptable within the regulations of the Federal Communications Commission, and may incorporate either a frequency modulated format or an amplitude modulated format. A plurality of transmitters may be electrically connected to a single computer sound board, each transmitter may be connected to its own sound board, or multiple sound boards may be connected to multiple transmitters.

In an alternate embodiment, a regionally located transmitter may be surrounded by a plurality of location identifying devices. In this embodiment, the stethoscope is capable of receiving signals while the bell is positioned some distance from the transmitter. In this embodiment, the appropriate signal to transmit depends on the specific stethoscope location as determined by the position identifying devices which may comprise switches activated by a magnet in the stethoscope, or an active transponder. When the stethoscope activates one of the location devices, the location device triggers the appropriate sound file to be played back to the stethoscope. As is apparent, this embodiment includes the benefit of providing many specific sound locations while requiring only a single transmitter.

In accordance with these and other objects which will become apparent hereinafter, the instant invention will now be described with particular reference to the accompanying drawings.

DETAILED DESCRIPTION OF THE INVENTION

Figure 1:
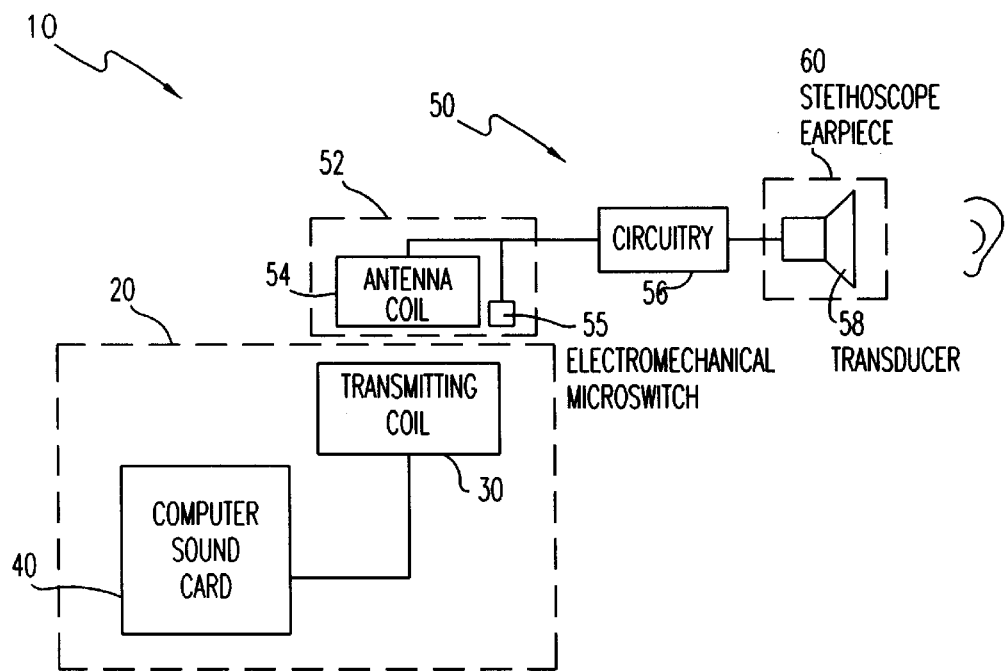
FIG. 1 is a schematic representation of an auscultation system according to the present invention.

FIG. 1 depicts a schematic representation of an auscultation system according to the present invention, generally referenced as 10. The system includes a patient simulating manikin torso 20 and a plurality of electromagnetic transmitters 30 having antenna coils positioned in locations, beneath the torso surface and proximal to specific anatomical locations where the monitoring of anatomical sounds is typically desired. Each transmitter is electrically connected to at least one computer sound card 40 which generates signals from prerecorded sound files stored in memory.

A stethoscope, generally referenced as 50, is adapted for receiving signals transmitted by the antenna coil of transmitter 30 and for converting the signals into sounds, heard by the stethoscope wearer, which sounds are free from external and unwanted noise. Stethoscope 50 includes a modified bell 52 having a signal receiving antenna coil 54 which is disposed such that, when properly positioned, the receiving antenna coil is in coaxial alignment with the transmitting antenna coil 30 thereby forming a linear transformer. Accordingly, the signal transmitted by transmitting coil 30 is received by stethoscope receiving coil 54. Once received, the signal is amplified and amplitude limited prior to demodulation by suitable circuitry 56 and a transducer 58 reproduces the sound in the stereoscope ear pieces 60. The stethoscope bell 52 may include an electromechanical micro switch 55 for activating the stethoscope electronics when the bell engages an auscultation surface on the manikin body 20.

The sound heard by the stethoscope wearer corresponds to the sound the wearer would hear by placing a conventional stethoscope bell on the same position on an actual live patient. Accordingly, the sounds heard by the stethoscope wearer are linked to physical locations on the manikin torso so that the sounds heard are anatomically accurate representations of sounds that would be heard on an actual patient using a conventional stethoscope.

Figure 2:
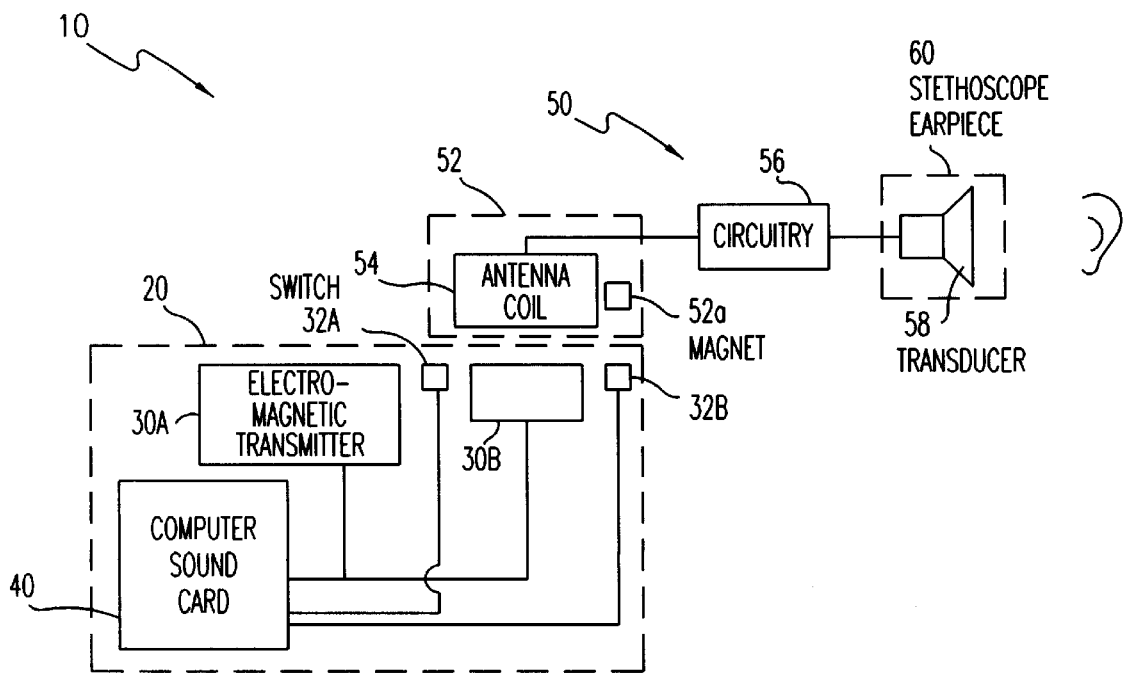
FIG. 2 is a schematic representation of an alternate embodiment auscultation system according to the present invention.

While the embodiment schematically depicted in FIG. 1 shows a single sound board and transmitting coil, the alternate embodiment depicted in FIG. 2 depicts an embodiment wherein a plurality of transmitters are electrically connected to a single computer sound board. The alternate embodiment in FIG. 2 includes a patient simulating manikin torso 20 and a plurality of electromagnetic transmitters 30a and 30b having antenna coils positioned in locations beneath the torso surface and proximal to specific anatomical locations where the monitoring of anatomical sounds is typically desired. Each transmitter is electrically connected to a computer sound board 40 which generates signals from prerecorded sound files stored in memory depending upon the transmitting coil, 30a or 30b, activated by the bell 52 of stethoscope 50.

In this embodiment, the appropriate signal to transmit depends on the specific stethoscope location as determined by position identifying switches 32a and 32b, which may be activated by a magnet 52a in the stethoscope. When the stethoscope activates one of the location devices, the location device triggers the sending of a signal representing the appropriate sound file that corresponds to the actual anatomical sounds that would be heard at that location on an actual patient.

Figures 3, 4, 5:
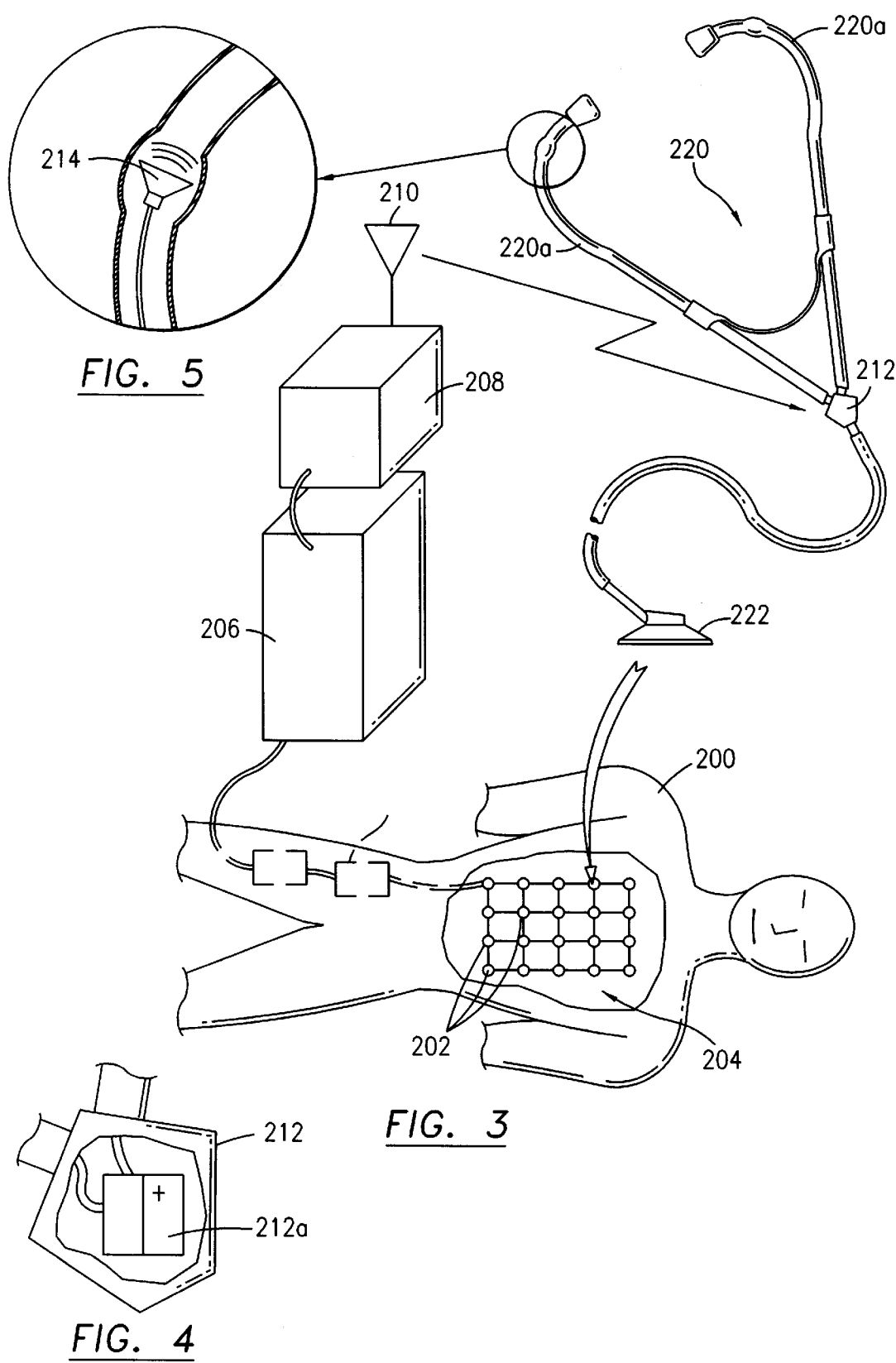
FIG. 3 illustrates an alternate embodiment auscultation system.
FIG. 4 is a fragmentary detail view of the radio frequency receiving portion of the stethoscope shown in FIG. 3.
FIG. 5 is a fragmentary detail view in partial section of a speaker in a sound conducting tube of the stethoscope shown in FIG. 3.

In another alternate embodiment depicted in FIGS. 3–5, there is depicted an embodiment of the present invention wherein a manikin 200 includes a plurality of sensors 202 which form a grid, generally referenced as 204. Grid 204 is electrically connected to electronic components including, without limitation, a computer 206 which includes a sound board, and a radio frequency transmitter 208. Transmitter 208 preferably includes an antenna 210 for transmitting a signal to a radio frequency receiver 212 disposed within a stethoscope, generally referenced as 220. FIG. 4 shows a partial cut-away view of a radio frequency receiver 212 which may include a battery power source 212a. Receiver 212 is electrically connected to a pair of speakers 214 each disposed within one of the sound conducting tubes 220a of stethoscope 220 as best depicted in FIG. 5. The user thus hears the sounds emanating from speakers 214 in stereo.

The embodiment depicted in FIGS. 3–5 functions as an electronic auscultation system as will now be described. A user, outfitted with stethoscope 220 positions the stethoscope bell 222 on grid 204. The position of the stethoscope bell 222 on the grid is detected by sensors 202 and electrically communicated to the sound board in computer 206 wherein previously recorded sound files are stored. The computer determines the appropriate sound file corresponding to the position of stethoscope bell 222, and the sound card generates a corresponding signal as an output to radio transmitter 208. Transmitter 208 converts the signal received from the sound card and transmits the signal from antenna 210 as a radio frequency wave. The signal is received by receiver 212 and electrically communicated to speakers 214 whereby the signal is converted into a sound heard by the user. As is apparent, the sound heard by the user corresponds to the location of the stethoscope bell, and the present invention contemplates that a plurality of stored sound files will enable the user to hear sounds that are virtually identical to the sounds the user would hear if the user applied a conventional stethoscope bell in a similar anatomical location on an actual live patient.

The instant invention has been shown and described herein in what is considered to be the most practical and preferred embodiment. It is recognized, however, that departures may be made therefrom within the scope of the invention and that obvious modifications will occur to a person skilled in the art.

What is claimed is:

1. A system for simulating sounds arising from human organs for use in an anatomical simulation device comprising:

a human patient mannequin torso;

a portable simulated stethoscope that includes a bell end piece;

a plurality of sensors forming a grid mounted in predetermined strategic locations within said human patient mannequin torso;

a computer including a sound board connected to said plurality of sensors;

a radio frequency transmitter including an antenna for transmitting RF signals connected to said computer;

said stethoscope including a RF receiver positioned in a location remote to said bell end piece for receiving RF signals sent by said radio frequency transmitter;

said sound board further having a sound card which generates RF signals from prerecorded sound files;

means mounted in said stethoscope attached to said receiver for generating audio sounds from the RF signals received by said receiver; and each of said sensors connected to said computer representing a different location with respect to said human patient mannequin torso and said sound board including a plurality of different pre-recorded organ sounds which are correlated with the location of each of said sensors so that said sensor can detect the presence of said stethoscope bell end piece and said computer provides the appropriate RF signals representing the human organ sound from that location to be received by said stethoscope.

2. An electronic auscultation system for simulating sounds arising from human organs for use in anatomical simulation comprising:
   a patient simulating mannequin torso for simulating the upper torso of a human being;
   at least one radio frequency (RF) transmitter having an antenna coil positioned in a predetermined location beneath said torso surface in an area of the torso where monitoring of anatomical sounds is desirable; and
   a computer having a sound board and at least one computer sound card capable of generating audio signals from pre-recorded sound information connected to said RF transmitter;
   a simulated stethoscope, said simulated stethoscope including a radio frequency receiver for receiving RF signals transmitted by said transmitter antenna coil, said stethoscope including a means for converting the RF signals into human audible sound waves within said stethoscope, said stethoscope including a bell end piece having a signal receiving antenna coil when the bell end piece is properly positioned with respect to the transmitter mounted in the torso.

3. An electronic auscultation system as in claim 1 further including:
   a plurality of RF transmitters having antenna coils positioned in a series of predetermined locations beneath the torso surface in areas where monitoring of anatomical sounds are desired, each of said RF transmitters being electrically connected to said computer sound card, each of said areas relative to the torso being capable of transmitting RF signals of different prerecorded sounds which represent a particular area in the human body where said RF transmitter is located based on the stethoscope bell antenna coil location.

4. A system for simulating human sounds that arise from specific human organs for use in anatomical simulation for teaching medical personnel medical procedures comprising:
   a mannequin torso that simulates a human patient having at least the upper torso representation of a human being above the waist;
   a regionally-located RF transmitter mounted within said mannequin torso;
   means for providing location identifying devices disposed in predetermined positions near said regionally-located transmitter, said location identifying devices each including a switch;
   a simulated stethoscope having an RF receiver and that includes a magnet for activating by proximity one of said location identifying switches; and
   means for providing an appropriate sound file in the form of RF signals to be transmitted from said regionally-located transmitter to said stethoscope RF receiver with appropriate human organ sounds representing the particular body area where the stethoscope is located relative to said torso whereby several different locations in said torso can be utilized with said stethoscope with a different human organ sound being transmittable based on a particular area of the torso identified by a location identifying device to the stethoscope using a single transmitter.

5. A system for simulating sounds arising from human organs for use in anatomical simulation device using a simulated stethoscope and a human patient mannequin torso comprising:
   a simulated stethoscope that includes a bell end piece;
   a plurality of sensors forming a grid mounted in predetermined strategic locations within said human patient mannequin torso;
   a computer including a sound board connected to said plurality of sensors;
   a radio frequency transmitter including an antenna for transmitting RF signal s connected to said computer;
   said stethoscope including a RF receiver for receiving RF signals sent by said transmitter;
   means mounted in said stethoscope attached to said receiver for generating audio sounds from the RF signals received by said receiver; and
   each of said sensors connected to said computer representing a different location with respect to said human patient mannequin torso and said sound board including a plurality of different pre-recorded organ sounds which are correlated with the location of each of said sensors so that said sensor can detect the presence of said stethoscope bell and said computer provides the appropriate RF signals representing the human organ sound from that location to be received by said stethoscope.

* * * * *